Jan. 10, 1967 L. A. FEKETE 3,296,807
PROCESS AND DEVICE FOR THE SEPARATION OF GASES
Filed Nov. 26, 1965 3 Sheets-Sheet 1
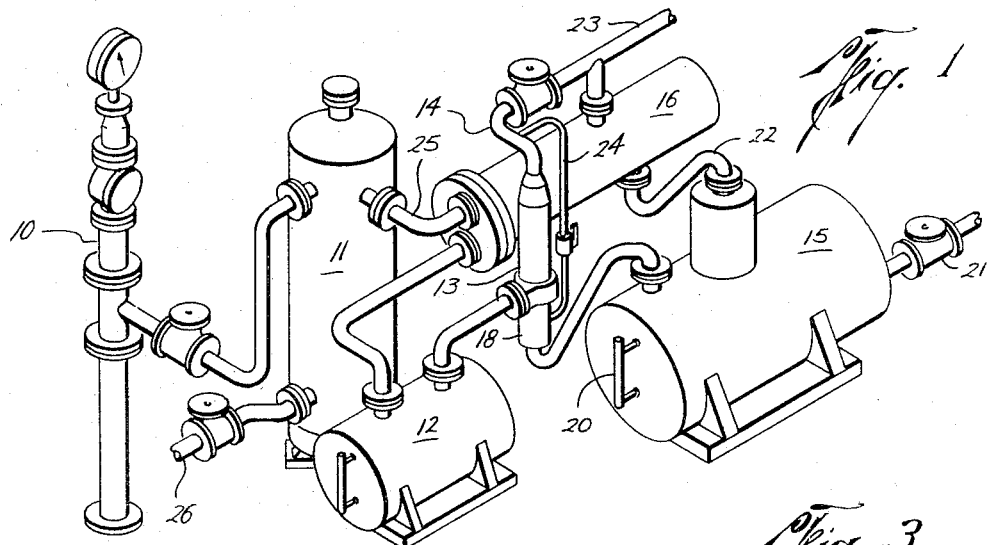
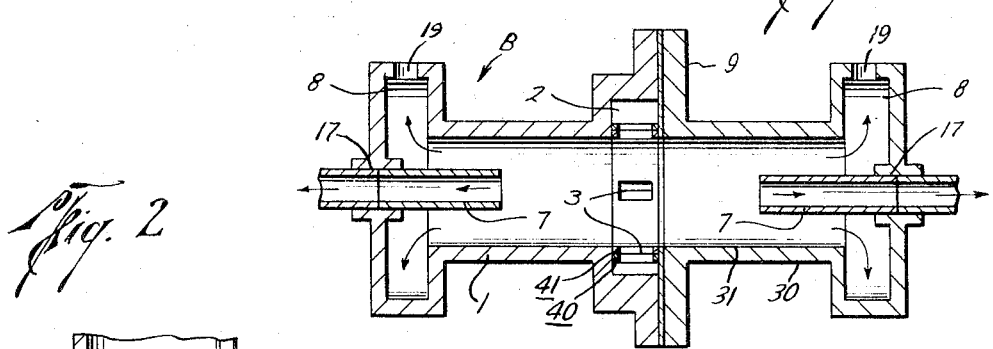
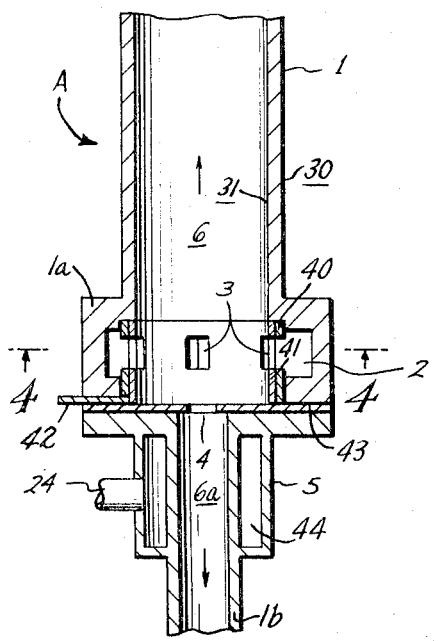
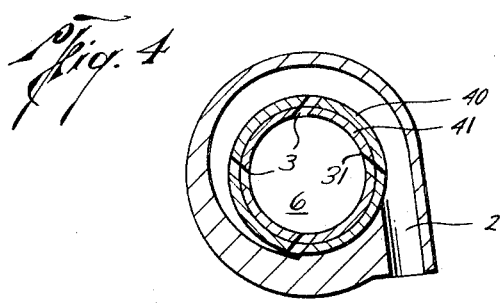
Lancelot A. Fekete
INVENTOR.

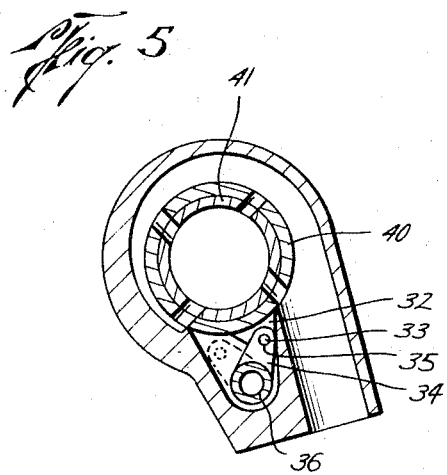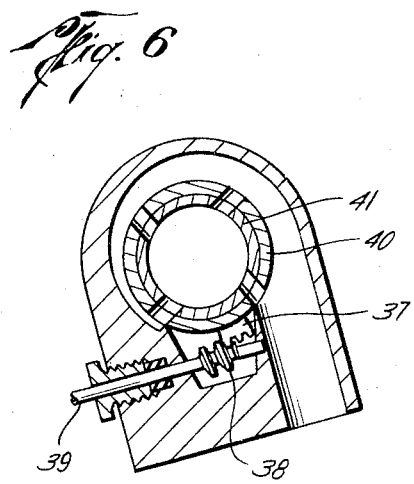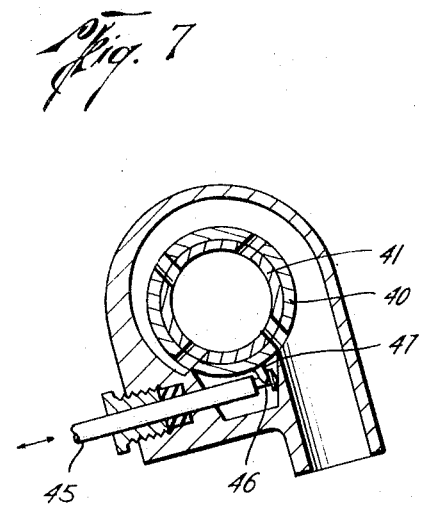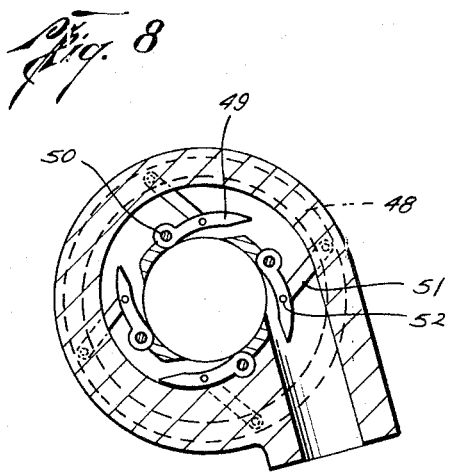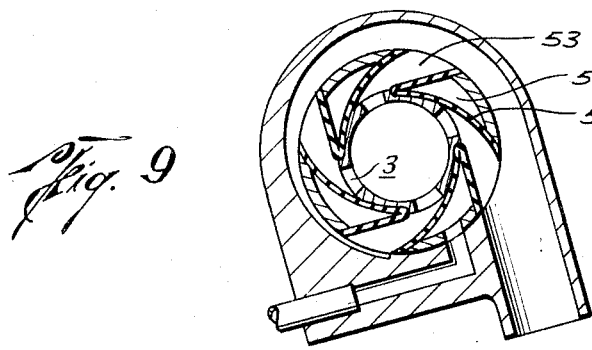
Lancelot A. Fekete
INVENTOR.
BY
ATTORNEY Jan. 10, 1967 L. A. FEKETE 3,296,807
PROCESS AND DEVICE FOR THE SEPARATION OF GASES
Filed Nov. 26, 1965 3 Sheets-Sheet 3
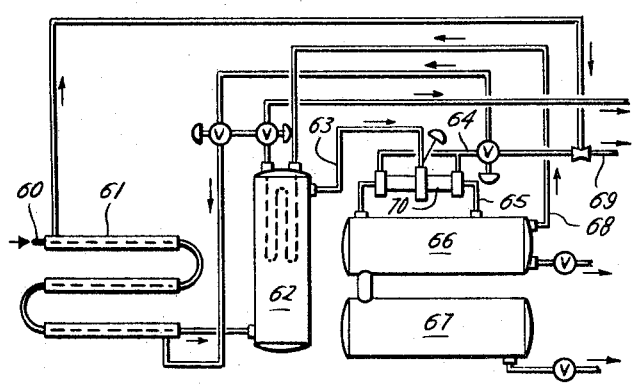
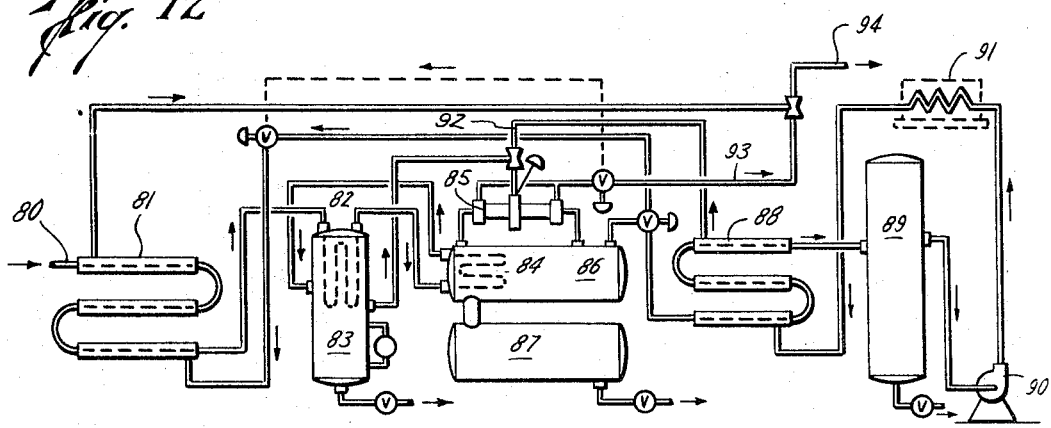
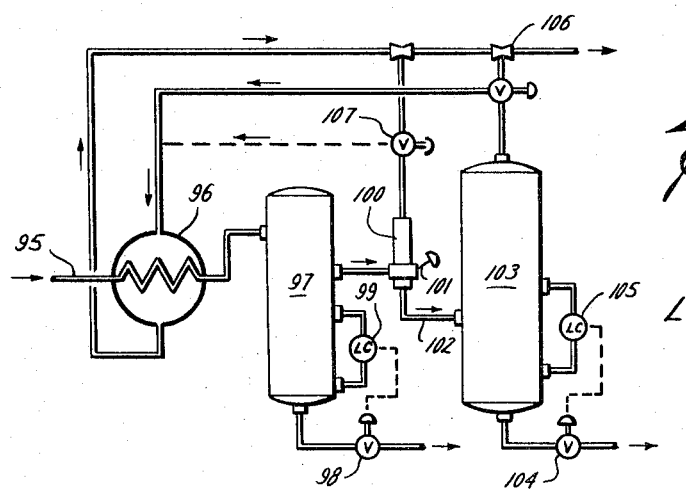
Lancelot A. Fekete
INVENTOR.
BY
ATTORNEYS United States Patent Office 3,296,807
Patented Jan. 10, 1967

3,296,807
PROCESS AND DEVICE FOR THE
SEPARATION OF GASES
Lancelot Andrew Fekete, Houston, Tex., assignor to
Armco Steel Corporation, Middletown, Ohio, a corporation of Ohio
Filed Nov. 26, 1965, Ser. No. 513,653
17 Claims. (Cl. 62—5)

This application is a continuation-in-part of my copending application Serial No. 316,638, filed October 16, 1963.

This invention relates to an improved process for the separation of gases and vapors, and to an improved vortex tube useful in accomplishing such separation. The process of this invention is particularly useful in the separation of natural gas and low molecular weight hydrocarbons.

The vortex tube was apparently invented by Georges J. Ranque and is sometimes called a Ranque tube. The features of such a tube are described in United States Patent No. 1,952,281. Basically, the vortex tube is a device containing substantially no moving parts wherein separation of a gaseous fluid into hot and cold fractions may be realized simply because of the velocity of the fluid inside the tube. The fluid entering such a tube is caused to move in a spiral path at large velocities. This movement causes the outer layer of fluid, adjacent the inner surface of the tube, to become heated above the temperature of the entering stream, while the central core is cooled to a temperature significantly below the temperature of the entering stream. In this manner, the entering gas fluid may be separated into relatively hot and cold fractions.

Since its development, the vortex tube has been the subject of a great deal of research and experimentation, with the result that various improvements, modifications, and refinements have been made in the structure and operation of such tubes. For example, some United States patents which illustrate such improvements are U.S. Patent No. 2,807,158, issued to J. R. J. van Dongen; U.S. Patent No. 2,581,168, issued to Arthur Bramley; U.S. Patent No. 2,683,972, issued to Robert G. Atkinson; U.S. Patent No. 3,116,344, issued to Paul F. Deisler, Jr.; U.S. Patent No. 2,907,174, issued to W. P. Hendal; and U.S. Patent No. 2,971,342, issued to D. W. Pilcher.

Each of the vortex tubes heretofore developed and each of the processes in which those tubes have been employed, including those disclosed in the foregoing United States patents, have had certain limitations. According to the present invention, a vortex tube of a new design is provided which is particularly advantageous when compared to the vortex tubes of the prior art, and processes employing such devices are provided whereby markedly superior separations are realized.

An object of this invention, therefore, is to provide an improved vortex tube of increased efficiency in design and operation.

A further object of this invention is to provide improved processes for the separation of gases and vapors by the use of an improved vortex tube.

Other objects and advantages of this invention will be apparent from further reading of this disclosure. In order that the manner in which the foregoing and other objects of this invention are attained can be understood in detail, one advantageous embodiment of the invention will be described with reference to the accompanying drawings, which form a part of this specification, and wherein:

FIGURE 1 is a pictorial view showing the use of a vortex tube constructed in accordance with this invention in conjunction with other apparatus at a well head to effect an improved separation and dehydration of the gaseous stream from the well.

FIGURE 2 is a vertical section of a vortex tube constructed in accordance with one embodiment of this invention.

FIGURE 3 is a horizontal section of a vortex tube constructed in accordance with another embodiment of this invention.

FIGURE 4 is a view taken along the line 4—4 of FIGURE 2.

FIGURE 5 is a view similar to FIGURE 4, illustrating one possible means for controlling the flow of fluid into the vortex tube.

FIGURE 6 is a view similar to FIGURE 4, illustrating another possible means for controlling the flow of fluid into the vortex tube.

FIGURE 7 is a view similar to FIGURE 4, illustrating another possible means for controlling the flow of fluid into the vortex tube.

FIGURE 8 is a view similar to FIGURE 4, illustrating another possible means for controlling the flow of fluid into the vortex tube.

FIGURE 9 is a view similar to FIGURE 4, illustrating another possible means for controlling the flow of fluid into the vortex tube.

FIGURE 10 is a flow sheet illustrating another embodiment of the process of this invention.

FIGURE 11 is a flow sheet illustrating another embodiment of the process of this invention.

FIGURE 12 is a flow sheet illustrating another embodiment of the process of this invention.

FIGURE 13 is a flow sheet illustrating another embodiment of the process of this invention.

Referring now in more detail to the drawings, in FIGURE 2 is illustrated a vortex tube A constructed in accordance with one embodiment of this invention. The tube A comprises a generally tubular elongated body 1 defining an outer surface 30 and an inner surface 31 and forming therein a fluid chamber 6. The body 1 is flanged radially outwardly from the longitudinal axis of the tube to form a flanged portion 1a of sufficient size to contain an opening 2 through which fluid may enter the chamber 6 in the tube.

The opening 2 preferably takes the form illustrated in FIGURE 2 and clearly viewed in cross-section in FIGURE 4. Here it is readily seen that the opening 2 is gently tapered or spiraled so that streamlined flow may be obtained. Flush with the inner surface 31 of the tube A in the area 1a is the inner surface of the first of two slotted rings 40 and 41. This inner ring 41 is seen to be concentrically oriented with the tubular body 1, and to fit sungly between the inner surface 31 at the point where it is extended outwardly to form the portion 1a and an annular plate 43. The inner ring 41 is fixed in place, and has therein at predetermined locations a plurality of slots 3 which are designed to mate with the corresponding slots 3 in the outer ring 40. The slots 3 and opening 2 are designed and constructed in such a manner that fluid entering the chamber 6 enters tangentially. It is noted that the inner surface of the inner ring 41 is flush with the extension of the inner surface 31, thus forming a smooth bore on the inside of the tube A. One or more slots 3 may be employed.

Slidingly adjustable around the outer surface of the inner ring 41 is a correspondingly-shaped outer ring 40, which also has a plurality of slots 3 therein. The outer ring 40 is circumferentially movable by any convenient means which may be generally indicated at 42, and which will be more fully explained in connection with FIGURES 5–7 below. Thus, by such movement of the slotted ring 40, the slots 3 in the rings 40 and 41 may be aligned to any extent desirable, thus adjusting the rate of fluid entry from the opening 2 into the interior of the tube.

On one side of the entry chamber 1a, the tube is of reduced diameter as is illustrated by the portion 1b. Between this reduced diameter portion 1b and the enlarged fluid entry portion 1a is an annular plate 43 perpendicular to the longitudinal axis of the tube. This plate has in the center thereof an opening or orifice 4.

The portion 1b of the vortex tube forms a fluid chamber 6a which may be conveniently surrounded by a tubular portion 5 thus defining an annular fluid chamber 44 for heating or cooling the fluid flowing through the chamber 6a. Frequently, it will be desirable to heat the fluid in this chamber by introducing through the conduit 24 the hot gas taken from the opposite end of the vortex tube.

In operation, a gaseous fluid under pressure is allowed to flow into the spiral opening 2 of the tube A, the outer ring 40 being adjusted by means as indicated schematically at 42 in order to assure the desired flow. The gas enters the chamber 6 tangentially at a high velocity, preferably near the velocity of sound. The fast-turning vortex thus formed within the tube causes the entering gas to be separated into two fractions. The first, or hot gas fraction, is adjacent the inner wall 31 of the tube, and the cold gas fraction is formed along the central longitudinal axis of the tube. The hot gas fraction passes from the tube through the portion 1, while the cold gas fraction, being situated along the central axis, passes through the orifice 4 and thence into the portion 1b of the tube to be removed at the end of the tube opposite the hot gas fraction. Condensing of the vapors in the portion 1b of the tube is realized, and this condensation may be further speeded by the provision of a cooling jacket around the vortex tube in this area.

Another embodiment of a vortex tube constructed in accordance with this invention is illustrated in FIGURE 3. Here again the tubular body portion 1 defines an inner surface 31 and an outer surface 30. Here also, the opening for fluid entry 2 into the vortex tube B is like the corresponding opening in the tube A, and contains identical rings 40 and 41 having slots 3 therein. In this embodiment, however, the diameter of the tubular portion 1 is substantially the same throughout the length of the tube except of course in the flanged fluid entry 9, and at each end of the tube where the tube is conveniently enlarged at 8. The portions 8 each have an openings 19 generally perpendicular to the central longitudinal axis of the tube in the outermost radial portion thereof. Through these openings the hot gas is emitted from the vortex tube.

The portions 8 also each contain an opening 17 along the central longitudinal axis of the tube. Into these openings are tightly fitted a pair of tubes 7 concentric with the vortex tube B and at either end thereof. It is seen that the diameter of the inner surface of the tube B is uniform throughout the length of the tube except for the end portions 8.

In operation, it is seen that this embodiment functions much like the FIGURE 2 embodiment, except that the hot gas stream leaves the tube through the openings 19 and the cold gas stream leaves the tube through the tubes 7. Thus, both hot gas and cold gas may be recovered at both ends of the tube, which in many applications is a distinctly advantageous method of operation.

Various means of controlling the amount of fluid entering the tube are illustrated in FIGURES 5–9. In FIGURE 5, such means conveniently take the form of a shaft 36 which extends through the portion 1a of the tube, the shaft being sealed in any convenient manner to insure a pressure-tight connection. The shaft 36 has at the end thereof adjacent the outer ring 40 a lever 34 which is adapted to slidingly fit around a bolt 33 in an outward extension 32 of the slotted outer ring 41. In this manner, the extension 32 may be easily rotated by manually turning the shaft 36 from the outside of the vortex tube, thus adjusting the ring 41.

In FIGURE 6 is illustrated another means for adjusting the ring 41. Here, the ring may be turned by means of a worm gear or screw actuating mechanism. In this embodiment, the ring 41 has an outward extension 37 in the form of a gear segment or cam extension which is engaged in the worm gear segment or screw 38 on the end of a shaft 39 which extends through the vortex tube so that it may be actuated from the exterior thereof. Once again, suitable seals as indicated at 39a should be included to insure against fluid leakage.

Still another means for moving the ring 41 is illustrated in FIGURE 7. In this embodiment, the push rod 45 is shaped much like the shaft of FIGURE 6, except here the push rod contains a groove 46, into which fits an outward extension 47 of the outer ring 41. The extension 47 may, for instance, be fork-shaped, or any other convenient shape to matingly fit in the groove 46. Actuation of the push rod thus imparts rotary movement to the ring 41. Once again, suitable seals as indicated generally at 45a may be employed.

Yet another embodiment for adjusting the ring 41 is shown in FIGURE 8. In this embodiment, the slots 3 are opened and closed by means of a plurality of hinged segments 49 each of which are anchored at one end by means such as a pin 50. At the other end of each such segment is a rod 51 attached to the segment at a point 52. Each of the rods 51 are secured to a relatively large movable ring 48 which may be turned from outside the vortex tube in any convenient manner.

Another means of controlling the amount of fluid entering the vortex tube is illustrated in FIGURE 9. In this embodiment fluid entering the tube must pass through a plurality of flexible pockets 53 before entering the slots 3, the side walls 55 of the pockets 53 forming extensions of said slots. These walls may be formed of material such as flexible metal, rubber, or synthetic polymeric material. Channels from the outside of the tube are provided for the introduction of hydraulic fluid as through conduits 56 to the areas 54 between the flexible walls 55 of the various slots. When fluid is so introduced under pressure, the pockets 53 become smaller thereby restricting the pockets 53 to reduce the fluid flow into the tube through these slots.

Of course, any of the control means illustrated in FIGURES 5–9 may be controlled by suitable automatic means as well as manually.

The improved vortex tubes as illustrated in the foregoing drawings are desirably constructed of any suitable material such as hard steel. The diameter of such tubes may vary from less than about one-half inch for uses in which small capacities are desired, to more than six inches for relatively large throughput capacities. For a tube diameter of about six inches, the inlet openings should be on the order of one square inch. Generally speaking, the tubes may be of a length of several times the diameter, for example 20 times. In this connection, it will be recognized that the accompanying drawings are not drawn to scale, but are illustrative only.

Construction of the vortex tube in the manner above described is found to be particularly desirable. One reason for this is that the inside wall of the vortex tube is always constant, and is never variable. Varying the inner surface of the tube at any point has been found to cause problems which are difficult to overcome. The construction also provides for a device of great strength which will last much longer than the vortex tube devices presently in use. The flowrate capacity of the vortex tube is dependent on the inlet cross-sectional area of the entrance openings and the velocity of the gaseous fluid entering the tube. The only way to vary the flowrate is by varying the inlet cross-sectional area, and of course this is done in the manner explained above. Control of the entering stream into the vortex tube in the above manner is found to significantly decrease turbulence. Such control may be utilized to obtain a constant cold stream temperature, a constant hot stream temperature, a constant pressure at some downstream point, or a constant pressure drop.

Further, by varying the ratio of the cold and hot streams, the temperature of either of these streams may be regulated. The downstream temperature is dependent on the division of the fluid in the tube into hot and cold streams. For example, if large flowrates are realized in the hot stream and small flowrates in the cold stream, the average temperature of the hot stream will be nearer the temperature of the inlet stream and the cold stream will be colder than if a large cold stream portion were taken from the tube.

Inside the vortex tube, the temperature distribution depends on the distribution of the radial centrifugal velocity component, since this determines the average velocity of vibration of the molecules. At small flowrates, the high sonic or even supersonic velocities are present only at the periphery, near the inner walls of the tubular body of the vortex tube. Under such circumstances, only a relatively small amount of high temperature gas may be obtained from the tube, and the temperature declines rather rapidly in a direction radially away from the inner wall of the tube. However, temperatures at the wall and inside are independent of the flowrate.

A particularly advantageous process for the use of the improved vortex tube in accordance with this invention is illustrated in FIGURE 1. Here, for example, a natural gas wellhead through its conventional Christmas tree 10 supplies gas to the scrubber 11, where the solid and liquid impurities are separated at 26. From the scrubber 11, the gas flows through line 25 to heat exchanger 16 and then into a second liquid separator 12. From separator 12, the gas stream enters tangentially into the vortex tube 13. The hot gas stream 14 leaves on the top, in the particular embodiment illustrated in FIGURE 1, either directly to the pipeline 23 or to the heat exchanger 16 where it is cooled by the relatively cold stream from the scrubber 11. The condensate passes into an intermediate condensate tank 15 where the lower boiling hydrocarbons are separated and passed into the hydrocarbon separator 21, and the gas is passed into the pipeline 23. Part of the hot gas stream may be used to heat the cold end 18 or the entrance of the vortex tube to prevent freezing and other difficulties, as, for example, by line 24. The cold gas stream of the vortex tube is passed to the condensate tank 15, where it drops its liquid content such as water, LPG, and lower boiling hydrocarbons. The water may be drained by an interface level control 20; the hydrocarbons are drained as at 21 by a level control into a separator. The cold gas may be passed through pipe 22 into the heat exchanger 16 and from the heat exchanger into the pipeline 23.

As exemplified in FIGURE 1, the process of the present invention is particularly useful in the separation of natural gas and hydrocarbons. It is particularly desirable in natural gas recovery processes in the field to accomplish as much separation as possible between the natural gas and the liquid materials such as water and the higher molecular weight hydrocarbons which form the liquified petroleum gases or simply "LPG." For this reason, it will often be desired in performing the process of the present invention to precool the feed entering the vortex tube. By precooling the gaseous inlet feed to about 50° F., a cold stream having a temperature as low as −25° F. may be obtained, about one-half of the ethane may be recovered from the natural gas.

Such a process is further illustrated in FIGURE 13. Here, the gas 95 from the wellhead is cooled in the heat exchanger 96 and condensate removed therefrom in the knockout vessel 97, the condensate being removed through the valve 98 which is operated by the level controller 99. The cleaned gas passes into the vortex tube 100 controlled by any suitable means 101, where the gas is divided into hot and cold fractions. The cold gas stream 102 is then passed into the separator 103 where the condensate therefrom is removed through the valve 104 operated by the level controller 105. The cold gas may thence be passed to the pipeline 106 or be returned to the heat exchanger 96 to precool the entering gas stream 95. The hot gas stream 107 may be passed to the pipeline 106, or, if it is desired to preheat rather than precool the incoming gas stream 95, this stream may be returned to the heat exchanger 96 to so preheat the stream 95.

At times, it has been found particularly advantageous to preheat the entering gas stream to prevent the formation of hydrates and emulsion depositions, as when the outside temperature is extremely low. In such cases, at least a part of the hot gas stream from the vortex tube may be used to preheat the entering gas stream in a heat exchanger or in a heating jacket around the vortex tube itself.

Such preheating may be desirably accomplished by means explained above in connection with the FIGURE 13 embodiment.

Under the certain conditions, it has been found distinctly desirable to both preheat and precool the gas mixture before entry into the vortex tube. Such a system is illustrated in FIGURE 10. Here, the entering gas stream 60 is desirably first heated in the heat exchanger 61 and then introduced into the knockout vessel 62. The upper part of the knockout vessel 62 is cooled by the cold gas from the separator to a temperature sufficient to eliminate most of the oil and water content thereof. The gas stream from the knockout vessel 62 is then introduced into the vortex tube 70 where it is separated into a hot stream 64 and a cold stream 65. The cold stream 65 is passed into a separator 66 and the water is then drained into the vessel 67. The cold gas 68 from the separator 66 is thence returned to the upper part of the knockout vessel 62 whereupon it cools the gas therein. The hot gas stream 64 may be recirculated to the heat exchanger 61, or may be passed to the pipeline 69.

In such a system, it is further seen that the alternative of precooling the entering gas stream in the heat exchanger 61 or heating in the vessel 62 may be realized without altering the equipment.

Field gas separation employing this invention may be accomplished at well pressures significantly lower than the present commercial processes without the addition of further refrigeration equipment, and thus frequently greatly increase the economic life of a well. However, booster compressors or the equivalent may be employed to allow the process of the invention to operate at even lower well pressures. In this connection the cold stream from the vortex tube may, after the condensate is removed, be compressed and the compressed gas injected into the entering gas stream in an injector. Such systems may be conveniently illustrated by reference to FIGURES 11 and 12. In FIGURE 11, the entering gas stream 71 from the wellhead is passed into an ejector 72 wherein the pressure of the stream 71 is increased so that a pressure drop of at least 1:2 is maintained in the vortex tube 73. In the vortex tube 73, the gas is divided into a cold stream 74 and a hot stream 78. The cold stream 74 is passed into the separator 75, and the condensate water drained into tank 79. The cold gas from the separator 75 is sucked into the compressor 76 and then the pressurized gas is passed into the air-cooled condenser 77. The cold high pressure gas is then returned to the injector 72 to pressurize the incoming gas stream 71, while the hot gas stream 78 is passed to the pipeline.

In FIGURE 12, the incoming gas stream 80 from the wellhead is heated or cooled in the heat exchanger 81, by gas from the vortex tube. The gas is then passed into the coils 82 of the vessel 83, where the gas is further cooled. The gas is then passed into the coils of the separator 84 and is then returned to the vessel 82 for removal of condensibles. The cleaned gas then enters the injector 92 where its pressure is increased, and then the vortex tube 85, where the gas is separated into a cold stream and a hot stream. The cold stream is passed into the separator 86 and the LPG and water are drained into the tank 87. The cold gas may then continue through the heat exchanger 88 into the receiving tank 89. The gas from the tank 89 is then compressed in the compressor 90, the compressed gas then being introduced into the air cooled condenser 91. The condensed gas is thence passed through the heat exchanger 88 to the injector 92 to thereby boost the pressure of the gas entering the vortex tube. The hot gas stream from the vortex tube 93 may be passed to the pipeline 94 or returned to the heat exchanger 81.

Any suitable type of automatic control may be used for the improved vortex tubes of this invention. For example, an automatic temperature control valve may be positioned in the cold gas effluent and a pressure control valve may be placed in the leaving hot gas stream. In this manner a constant downstream pressure, and/or desired hot stream and cold stream temperatures may be maintained.

The processes of this invention as illustrated by the above examples are not only particularly advantageous because of the superior separation realized, but also because they are safe in that combustion is not involved. This of course is particularly important in field operations.

The separation process can be used, in a simpler form, in chemical plants for the separation of condensibles from the gases, and the cooling effect can be used in chemical reactions where condensation should be achieved by cooling. Lower temperatures can be obtained when using the vortex tube in series. In most cases proper insulation of all parts will be necessary.

It will be apparent to those skilled in the art that the vortex tube of this invention provides streamlined flow which results in greater temperature differences from those known in the prior art.

Though my invention has been described in terms of particularly useful embodiments, it is limited only by the scope of the appended claims, wherein the term "gas" is used in its broadest sense and includes, for instance, gas mixtures, natural gas, and gas-vapor mixtures.

I claim:

1. A gas separating device of the vortex tube type, which consists of a cylindrical separation chamber into which a gas enters through a spiral channel and tangential slots at high velocity, forming a fast turning spiral vortex, the center of which is colder than, the outer part hotter than, the entering gas, whereby the cold gas is removed through two central tubes toward both ends of the separation chamber and the hot gas is discharged through an annular cylinder outwards, on both sides of said chamber, and flow control means for regulating the flow of gas into the device.

2. The invention according to claim 1, wherein said flow control means comprises a moving circular ring which opens and closes the entrance slots on the inner peripheral entrance of the separating chamber so that larger or smaller quantities of gas may enter at near sonic velocity into the device, and adjusting means for turning said rings.

3. The invention according to claim 2 wherein said ring includes an outward extension and said adjusting means comprises a shaft adapted upon actuation to impart rotary motion to said extension.

4. The invention according to claim 2 wherein said ring includes an outward extension and said adjusting means comprises a shaft having a worm gear segment adjacent said extension and adapted to mate with said extension to impart movement thereto upon rotation of said shaft.

5. The invention according to claim 2 wherein said ring contains an outward extension and said adjusting means comprises a push rod extending outside said tube and, at its inner end, being in mating engagement with said extension, whereupon actuation of said push rod imparts rotary movement to said ring.

6. The invention according to claim 1, wherein said flow control means comprises a plurality of hinged segments actuated by a ring which may be turned from outside said tube.

7. The invention according to claim 1, wherein said flow control means comprises a plurality of pockets having flexible side walls, whereby entry of a gas under pressure acts to restrict said pockets causing reduced gas flow therethrough.

8. A gas separating device of the vortex tube type, which consists of a cylindrical separation chamber into which a gas enters through a spiral channel and tangential slots into the cylindrical separation chamber at high velocity, forming a fast turning spiral vortex, the center of which is colder than, the outer part hotter than, the entering gas, whereby the cold gas is removed through a central orifice at one end of said chamber and the hot gas flows out at the other end of said chamber, wherein the cold end of said chamber contains a jacket in which said hot gas is recirculated.

9. A gas separating device of the vortex tube type which comprises a cylindrical separation chamber into which a gas enters through a spiral channel and tangential slots at high velocity, forming a fast turning spiral vortex the center of which is colder than, the outer part hotter than, the entering gas, whereby the cold gas is removed at one end of said chamber and the hot gas is removed at the other end of said chamber, and flow control means for regulating the flow of gas into the device, wherein said flow control means comprises a movable ring which opens and closes the entrance slots on the inner peripheral entrance of the separating chamber so that larger or smaller quantities of gas may enter at near sonic velocity into the device, and adjusting means for turning said ring.

10. The invention according to claim 9 wherein said ring includes an outward extension and said adjusting means comprises a shaft adapted upon actuation to impart rotary motion to said extension.

11. The invention according to claim 9 wherein said ring includes an outward extension and said adjusting means comprises a shaft having a worm gear segment adjacent said extension and adapted to mate with said extension to impart movement thereto upon rotation of said shaft.

12. The invention according to claim 9 wherein said ring contains an outward extension and said adjusting means comprises a push rod extending outside said tube and, at its inner end, being in mating engagement with said extension, whereupon actuation of said push rod imparts rotary movement to said ring.

13. An improved process for the separation of natural gas and hydrocarbons which comprises heating a gas stream without combustion in a heat exchanger to prevent hydrate and emulsion deposition, passing the heated gas into a vortex tube at high velocity to thereby form a hot stream and a cold stream, withdrawing said hot stream, and thence employing said hot stream in said heat exchanger.

14. The invention according to claim 13 wherein the preheating is accomplished by means of a jacket around said vortex tube.

15. An improved process for the separation of natural gas and hydrocarbons which comprises first preheating a gas stream in a heat exchanger, thence cooling said gas stream in a knockout vessel to remove condensable materials and cool said gas stream, and thence passing said cooled gas stream into a vortex tube at high velocity to thereby form a hot stream and a cold stream, withdrawing said cold stream, removing the condensate therefrom and employing said cold stream in said knockout vessel, and withdrawing said hot stream for use in said heat exchanger.

16. A gas separating device of the vortex tube type which comprises a cylindrical separation chamber into which a gas enters through a spiral channel and tangential slots at high velocity, forming a fast turning spiral vortex the center of which is colder than, the outer part hotter than, the entering gas, whereby the cold gas is removed at one end of said chamber and the hot gas is removed at the other end of said chamber, and flow control means for regulating the flow of gas into the device, wherein said flow control means comprises a plurality of hinged segments actuated by a ring which may be turned from outside said tube.

17. A gas separating device of the vortex tube type which comprises a cylindrical separation chamber into which a gas enters through a spiral channel and tangential slots at high velocity, forming a fast turning spiral vortex the center of which is colder than, the outer part hotter than, the entering gas, whereby the cold gas is removed at one end of said chamber and the hot gas is removed at the other end of said chamber, and flow control means for regulating the flow of gas into the device, wherein said flow control means comprises a plurality of pockets having flexible side walls, whereby entry of a fluid under pressure acts to restrict said pockets causing reduced gas flow therethrough.

References Cited by the Examiner

UNITED STATES PATENTS

| | | | |
|---|---|---|---|
| 2,522,787 | 9/1950 | Hughes | 62—5 |
| 2,741,899 | 4/1956 | Von Linde | 62—5 |
| 2,893,214 | 7/1959 | Hendal | 62—5 |
| 2,907,174 | 10/1959 | Hendal | 62—5 |

WILLIAM J. WYE, *Primary Examiner.*